United States Patent [19]

Leiter

[11] Patent Number: 5,182,962
[45] Date of Patent: Feb. 2, 1993

[54] ACTUATING FORCE TRANSMISSION UNIT FOR A GEAR CHANGE MECHANISM OF A BICYCLE

[75] Inventor: Berndt Leiter, Waigolshausen, Fed. Rep. of Germany

[73] Assignee: Fichtel & Sachs AG, Schweinfurt, Fed. Rep. of Germany

[21] Appl. No.: 768,997

[22] Filed: Sep. 30, 1991

[30] Foreign Application Priority Data

Oct. 6, 1990 [DE] Fed. Rep. of Germany ....... 4031763

[51] Int. Cl.$^5$ .................................... F16H 59/02
[52] U.S. Cl. .................... 74/473 R; 74/502.6; 192/6 A; 280/238; 475/300
[58] Field of Search .............. 74/473 R, 502.6; 192/6 A; 280/238; 475/290, 300

[56] References Cited

U.S. PATENT DOCUMENTS

| 863,422 | 8/1907 | Newton | 192/6 A |
|---|---|---|---|
| 2,609,712 | 9/1952 | Hood | 475/300 |
| 4,798,098 | 1/1989 | Keller et al. | 74/470 |

FOREIGN PATENT DOCUMENTS

| 2717304 | 3/1977 | Fed. Rep. of Germany . | |
| 2723869 | 12/1977 | Fed. Rep. of Germany . | |
| 537868 | 6/1959 | France | 475/300 |
| 1580405 | 12/1980 | United Kingdom . | |
| 2136065 | 9/1984 | United Kingdom . | |

Primary Examiner—Allan D. Herrmann
Attorney, Agent, or Firm—Brumbaugh, Graves, Donohue & Raymond

[57] ABSTRACT

According to an illustrative example of the invention a transmission lever for transmitting an actuating force from a pull cable to a push rod of a bicycle hub gear change mechanism is pivotally mounted on a housing. The housing is provided with a sleeve which sleeve is rotatable and axially fixed with respect to the housing. The sleeve is provided with an internal thread for engagement with an external thread of a hub axle. For assembling the housing with the hub axle the sleeve can be locked against rotation with respect to the housing.

19 Claims, 2 Drawing Sheets 5,182,962

ACTUATING FORCE TRANSMISSION UNIT FOR A GEAR CHANGE MECHANISM OF A BICYCLE

BACKGROUND OF THE INVENTION

The actuating force for a gear change mechanism of a bicycle hub is usually transmitted from an actuator device fastened to the handle bar of the bicycle to the gear change mechanism by a pulling cable such as a Bowden wire. On the other hand, gear change mechanisms in bicycles are known in which the gear change is effected by a push rod accommodated by an axial bore of the hub axle.

In case of a combination of such a cable transmission and such a push rod actuated gear change mechanism it is necessary to provide at an end portion of the hub axle an actuating force transmission unit which transforms the pull movement of the cable into a push movement of the push rod.

The actuating force transmission unit must be releasably mounted on the respective end portion of the hub axle such that, on the one hand, the actuating force transmission unit takes a well defined axial position along the axis of the hub axle and, on the other hand, the orientation of the actuating force transmission unit is adapted to the path of the respective cable. Moreover, the actuating force transmission unit is not allowed to become loosened during a long period of use of the respective bicycle.

STATEMENT OF THE PRIOR ART

From the German Patent 27 23 869 an actuating force transmission unit is known which is screwed by internal thread means on an external thread means of an end portion of the hub axle. For preventing a loosening of the unit from the hub axle a tangential pin is inserted into the mounting socket of the unit which pin engages a tangential groove of the hub axle. This embodiment is relatively complicated in manufacturing and in handling.

If a predetermined orientation of the unit is wanted this is only possible by loosening the fastening means by which the axle is fastened to the bicycle frame, rotating the hub axle towards the desired orientation and hereupon fastening the fastening means again.

From the German Patent 27 17 304 a further embodiment of an actuating force transmission unit is known in which a mounting bracket of the actuating force transmission unit is clamped between a frame part of the bicycle and a fastening nut by which the hub axle is fixed to this frame part. In this embodiment, too, a reorientation of the housing is only possible by loosening the fastening nut.

OBJECT OF THE INVENTION

It is a primary object of the present invention to provide an actuating force transmission unit which can easily be oriented in accordance with the path of a transmission cable or the like on the respective bicycle. A further object is to make sure that the actuating force transmission unit, once mounted on the hub axle, is safely fastened to the hub axle for a long period of time such that a misadjustment of the gear change mechanism as a result of loosening of the unit with respect to the hub axle is avoided. A still further object of the invention is to provide a transmission unit which is of simple and economic design and can easily be fastened to the respective hub axle.

SUMMARY OF THE INVENTION

In order to achieve at least part of the above defined objects an actuating force transmission unit for connecting an actuator device and a gear change mechanism of a bicycle hub is provided.

The bicycle hub has an axle and an axial bore within said axle along an axis of said axle. The axle has an externally threaded axial end portion adapted to be connected with a housing of the actuating force transmission unit. The axial bore accommodates a push member acting onto the gear change mechanism.

The actuating force transmission unit comprises a housing adapted to be mounted onto the axial end portion of the axle by internal thread means engageable with the externally threaded end portion of the axle. A transmission lever is pivotally mounted on the housing about a pivot axis substantially orthogonal with respect to the axis of the axle. Said transmission lever has a first lever arm engageable with the push member and a second lever arm adapted for being connected with actuating force transmitting means extending between the second lever arm and the actuator device.

The internal thread means are provided within a sleeve member having a sleeve axis. This sleeve member is mounted with respect to the housing such as to be rotatable with respect to the housing about the sleeve axis and to be fixed with respect to the housing along the sleeve axis.

As the housing is freely rotatable with respect to the sleeve member it can easily be brought into any desired orientation without influence on the fastening of the sleeve member. Such the sleeve member can be easily and safely fastened and hereupon the housing can be rotated with respect to the sleeve member towards the respective desired orientation.

Torque transmitting, releasable coupling means may be provided for coupling the housing and the sleeve member for common rotation about the sleeve axis.

Such a mounting tool for fastening the sleeve member to the hub axle may be avoided because the housing and possibly also the transmission lever offer a sufficient leverage for safely screwing the sleeve member onto the hub axle.

The coupling means may comprise a coupling portion of the transmission lever and a coupling engagement portion of the sleeve member. The coupling portion of the transmission lever can be engaged with the coupling engagement portion of the sleeve member by pivoting the transmission lever about the pivot axis. Preferably, the coupling portion of said transmission lever is a part of the second lever arm adjacent the sleeve member.

On the other hand, the coupling engagement portion of the sleeve member may be provided by an axially extending groove of an external circumferential surface of the sleeve member. The axial groove may be one of a group of axially extending grooves distributed about the periphery of the sleeve member.

The housing may be provided with a slot adjacent to the sleeve member and substantially parallel to the sleeve axis for permitting engagement of the coupling portion of the transmission lever and the coupling engagement portion of the sleeve member through this slot.

For precisely positioning the transmission unit to the hub axle the sleeve member and the axle may be provided with axial abutment means engageable with each other for fixing the sleeve member and the housing with respect to the axle along the axis thereof. For providing such an abutment means, the sleeve member has a radially inwards directed abutment ring engageable with an axially directed endface of the axle.

The sleeve member is preferably accommodated within the housing of the transmission unit in order to obtain a compact design of a small dimension along the axis of the hub axle.

The sleeve member may have an annular, substantially axially directed shoulder face engageable with a corresponding shoulder face of the housing. The shoulder face of the sleeve member can be held in engagement with the shoulder face of the housing by a resilient ring member engageable with an internal surface of housing and with an axial endface of the sleeve member. Such the sleeve member can easily be inserted into a socket portion of the housing and secured therein against axial movement by the resilient ring member.

A most compact arrangement is obtained if the pivot axis is located on the housing at a location axially and radially outside the axle, if the first lever arm extends in substantially orthogonal direction with respect to the axis of the axle and if the second lever arm is substantially parallel to the axis of the axle and extends from the pivot axis in a direction towards a further end portion of the axle.

The transmission lever is biased by spring means toward a terminal pivotal position. In order to facilitate the mounting of the transmission unit onto the axle, the transmission lever may be biased towards a pivotal position, in which the coupling portion of the transmission lever is in coupling engagement with the coupling engagement portion of the sleeve member.

In order to initially adjust the transmission unit and the transmitting means to the respective actuator device and the respective gear change mechanism such that a predetermined position of the actuator unit results in a predetermined gear change position of the push member, one of the actuating force transmission unit and the actuating force transmitting means may comprise adjustment means for adjusting respective gear change positions of the push member.

The actuating force transmitting means may comprise an actuating force transmitting cable, such as a Bowden cable.

Prefereably the adjustment means are provided between the second lever arm and an actuating force transmitting cable connected to the actuator device.

For facilitating an adjustment operation the adjustment means preferably comprise an adjustment bolt and an adjustment housing. The adjustment bolt may be provided with a plurality of indentations, the adjustment housing may be provided with a spring biased pawl member, and the pawl member may be engageable with said indentations. Such adjustment means are well known in the art e.g. by the U.S. Pat. No. 4,798,098. With such adjustment means the adjustment bolt is freely shiftable with respect to the adjustment housing in a first shifting direction with the pawl member being liftable from engagement with the indentations in response to the shifting in said first shifting direction. On the other hand, the adjustment bolt is locked against movement in a second shifting direction with respect to the adjustment housing by the pawl member biased into engagement with a respective indentation.

The adjustment bolt may be pivotally connected to said second lever arm about a connection axis substantially parallel to the pivot axis such that the leverage for fastening the housing on the threaded hub axle is further improved.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings in which.

DETAILED DESCRIPTION OF THE PREFERRED EMBODIMENT

Figure 3:
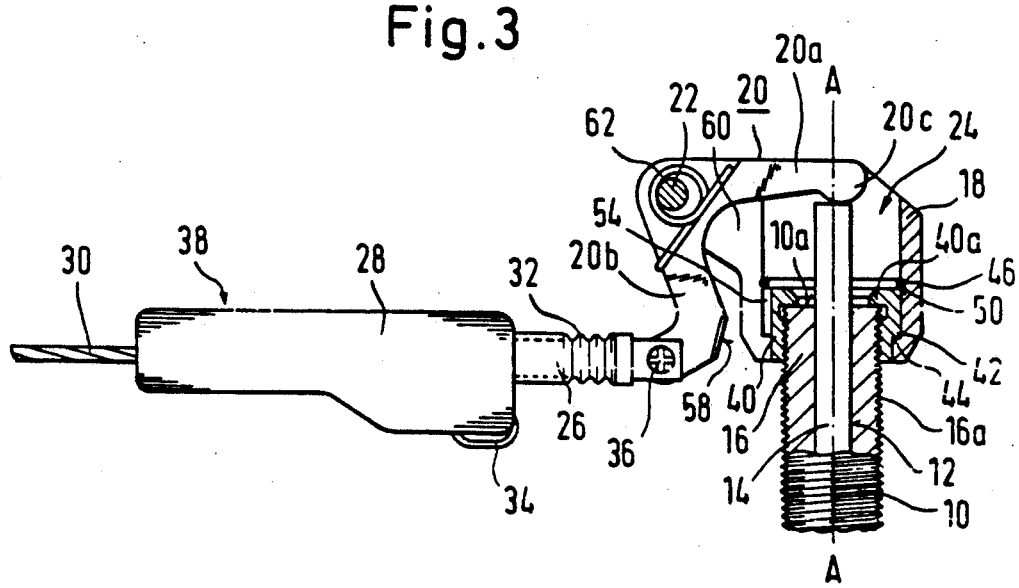
FIG. 3 shows a side view according to FIG. 2 in an operative condition.
Figure 4:
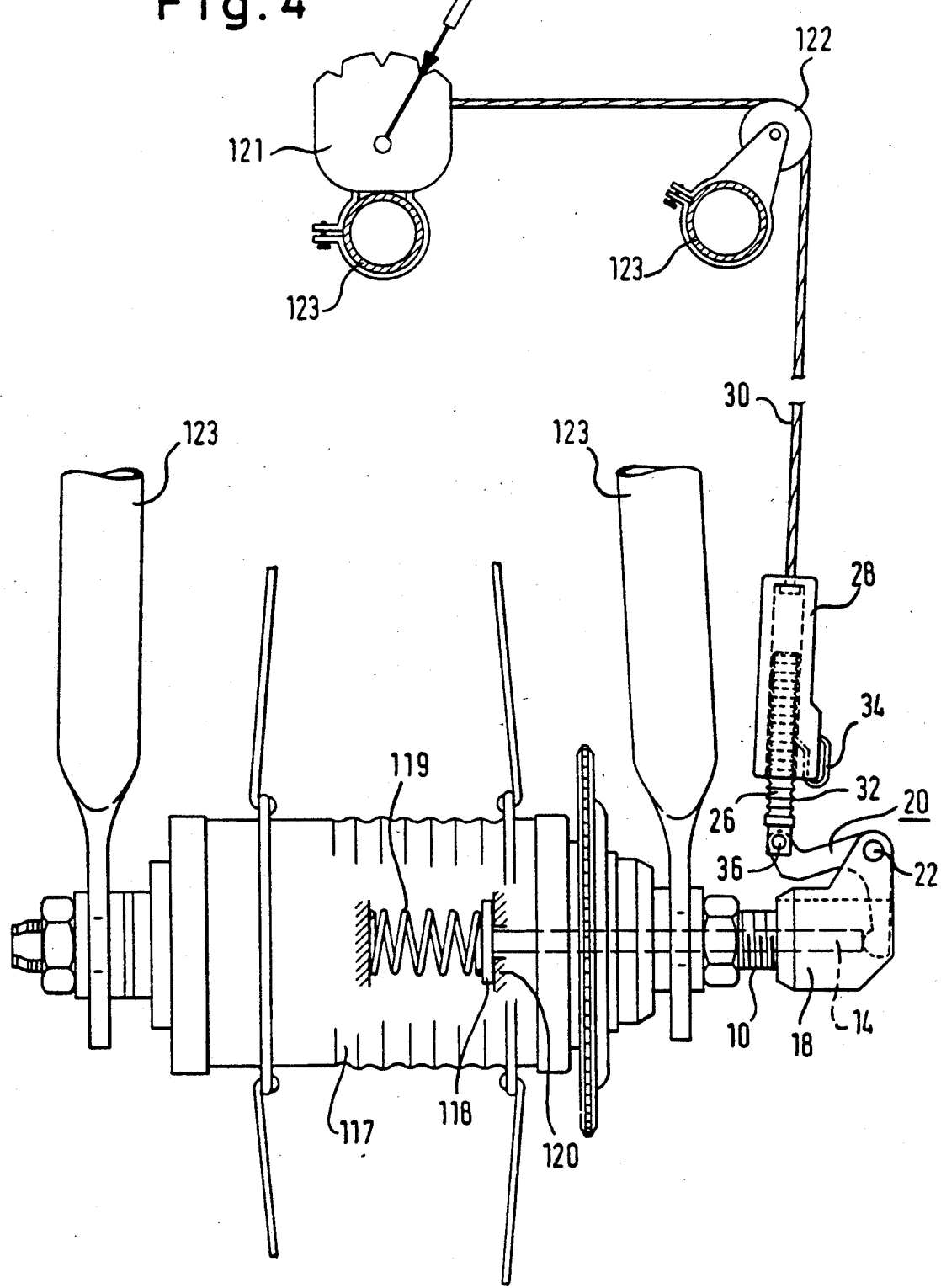
FIG. 4 schematically shows an actuator, a shifting cable assembly, an actuating force transmission unit, a gear change mechanism and a bicycle hub in combination, in accordance with a preferred embodiment of the invention.

In FIG. 3 the hub axle of a bicycle hub is designated by 10. The bicycle hub itself is not shown and may be of conventional design. The hub axle 10 is provided with an axial bore 12 extending along an axis A—A of the hub axle 10. This bore 12 accommodates a push rod 14 which is axially movable along the bore 12 against an internal spring of the hub. By axial movement of the push rod 14 in a plurality of discrete axial positions a gear change mechanism within the hub can be switched into different gear conditions. The internal spring biases the push rod 14 outwards of the upper end portion 16 of the axle as shown in FIG. 3. A housing 18 is fastened to the end portion 16. In this housing there is a pivotally mounted transmission lever 20 pivotable about a pivot axis 22. This pivot axis 22 is established by a pin member. The transmission lever 20 comprises a first lever arm 20a and a second lever arm 20b. The first lever arm 20a is provided with an engagement nose 20c engageable with the push rod 14. The unit comprising the housing 18 and the transmission lever 20 is regarded as an actuating force transmission unit 24.

The second lever arm 20b is connected with an adjustment bolt 26 by a joint 36. The adjustment bolt 26 enters into an adjustment housing 28. This adjustment housing 28 is connected by a cable 30 with an actuator switch mounted e.g. onto the handle bar of the respective bicycle. The adjustment bolt 26 is provided with indentations 32 along its axis. These indentations may be shaped as annular grooves between respective annular ribs, said ribs having a saw tooth profile. A locking pawl 34 is provided in the adjustment housing 28. This locking pawl is engageable with the indentations 32 of the adjustment bolt. Due to the saw tooth profile of the annular ribs on the adjustment bolt 26 the adjustment bolt can be freely moved inwards of the adjustment housing 28 with the locking pawl 34 being lifted by subsequent ribs. An outward movement of the adjustment bolt 26 is prevented by the locking pawl 34 and can only be permitted by an external force acting onto the locking pawl 34.

The unit comprising the adjustment housing 28 and the adjustment bolt 26 forms an adjustment unit 38.

By means of the actuator switch (not shown) the transmission lever 20 can be pivoted about the pivot axis 22 and such that the first lever arm 20a can move the push rod 14 through a plurality of discrete positions corresponding to different gears of the gear change mechanism. By adjusting the adjustment bolt 26 with respect to the adjustment housing 28 the effective length of the transmission means, i.e. the cable 30 can be selected such that in the various discrete positions of the actuator switch (not shown) corresponding gears of the gear change mechanism are selected.

The housing 18 is fastened on an external thread 16a of the end portion 16 of the hub axle 10. A sleeve member 40 has a shoulder face 42 which is engaged with a shoulder 44 of the housing 18. A resilient ring 46 is engaged with an internal circumferential groove 50 of the housing 18 and is in axial engagement with the sleeve member 40. By such design, the sleeve member 40 is freely rotatable with respect to the housing 18 about a sleeve axis B—B, which sleeve axis B—B coincides with the axis A—A of the axle 10 in the assembled condition. The sleeve member 40 is provided with an internal thread 52 which mates the external thread 16a of the hub axle 10.

For assembling the housing 18 and the axle 10 the sleeve member 40 is screwed onto the external thread 16a. For this screwing operation the sleeve member 40 must be locked against rotation with respect to the housing 18.

Figure 1:
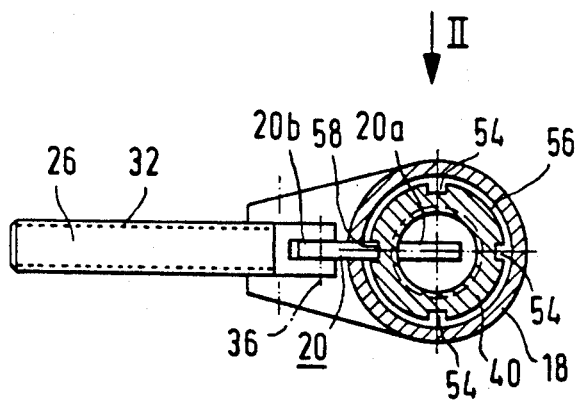
FIG. 1 shows an actuating unit partly in section along line I—I of FIG. 2 in an operative position with respect to a hub axle as seen along the axis of the hub axle.
Figure 2:
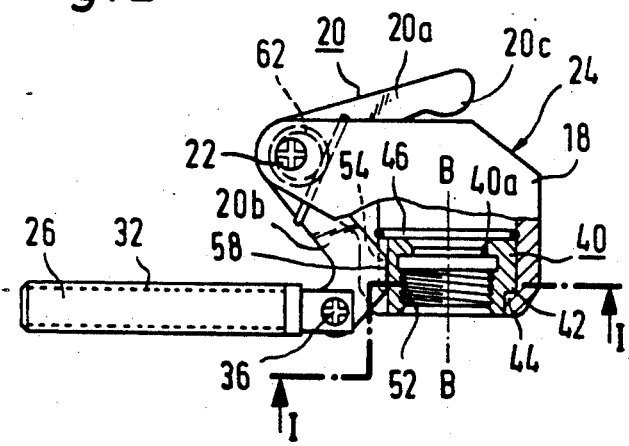
FIG. 2 shows a side view of the actuating unit as seen along the arrow II of FIG. 1 in an assembling condition for being mounted on a hub axle.

For locking the sleeve member 40 and the housing 18 against relative rotation the sleeve member 40 is provided with a plurality of axially extending grooves 54 in its outer circumferential surface 56. Further the second lever arm 20b is provided with a knife portion 58 engageable with one of the grooves 54. For permitting engagement of the knife portion 58 into one of the grooves 54 the housing 18 is provided with a slot 60 in a plane containing the axis A—A. By pivoting the transmission lever 20 in anticlockwise direction from the position as shown in FIG. 3 toward the position as shown in FIG. 2. The knife portion 58 can pass through the slot 60 and enter into one of the grooves 54. Now the sleeve member 40 is locked for common rotation with the housing 18. So the sleeve member 40 can be screwed onto the external thread 16a by turning the housing 18. The transmission lever 20 and the bolt member 26 afford a sufficient leverage for fastening the sleeve member 40 safely on the end portion 16 of the axle 10. The terminal position of the sleeve member 40 with respect to the axle 10 is defined by an annular ring member 40a of the sleeve member 40 engaging an end-face 10a of the hub axle 10.

A torsional spring 62 surrounding the pivot axis 22 biases the transmission lever 20 towards a locking position in which the knife portion 58 engages one of the grooves 54.

The adjustment bolt 26 is inserted into the adjustment housing 28, after the adjustment housing 28 has been fastened to the hub axle 10. Such the transmission lever 20 is pivoted into the position shown in FIG. 3. In this position the housing 18 is freely rotatable with respect to the sleeve member 40. The transmission lever 20 can therefore be oriented according to the path of the cable 30. In addition to features described above and shown in FIGS. 1-3, FIG. 4 shows a bicycle hub 117, a gear change mechanism represented by a shifting element 118 which is biased by a spring 119 to a basic position determined by a stop 120, a manually operable gear shift actuator device 121, a deflection pulley 122, and bicycle frame tubing 123.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. An actuating force transmission unit for connecting an actuator device and a gear change mechanism of a bicycle hub,
    said bicycle hub having an axle (10) and an axial bore (12) within said axle (10) along an axis of said axle (10), said axle (10) having an externally threaded axial end portion (16) adapted to be connected with a housing (18) of said actuating force transmission unit (24), said axial bore (12) accommodating a push member (14) acting onto said gear change mechanism,
    said actuating force transmission unit comprising a housing (18) adapted to be mounted onto said axial end portion (16) of said axle (10) by internal thread means (52) engageable with said externally threaded end portion (16), a transmission lever (20) being pivotally mounted on said housing (18) about a pivot axis (22) substantially orthogonal with respect to said axis (A—A) of said axle (10), said transmission lever (20) having a first lever arm (20a) engageable with said push member (14) and a second lever arm (20b) adapted for being connected with actuating force transmitting means (30) extending between said second lever arm (20b) and said actuator device,
    said internal thread means (52) being provided within a sleeve member (40) having a sleeve axis (B-B), said sleeve member (40) being mounted with respect to said housing (18) such as to be rotatable with respect to said housing (18) about said sleeve axis (B-B) and to be fixed with respect to said housing (18) along said sleeve axis (B—B).

2. An actuating force transmission unit as claimed in claim 1, torque transmitting, releasable coupling means (58, 54) being provided for coupling said housing (18) and said sleeve member (40) for common rotation about said sleeve axis (B—B).

3. An actuating force transmission unit at set forth in claim 2,
    said coupling means (58, 54) comprising a coupling portion (58) of said transmission lever (20) and a coupling engagement portion (54) of said sleeve member (40), said coupling portion (58) of said transmission lever (20) being engageable with said coupling engagement portion (54) of said sleeve member (40) by pivoting said transmission lever (20) about said pivot axis (22).

4. An actuating force transmission unit as set forth in claim 3, said coupling portion (58) of said transmission lever (20) being a part of said second lever arm (20b) adjacent said sleeve member (40).

5. An actuating force transmission unit as set forth in claim 3, said coupling engagement portion (54) of said sleeve member (40) being provided by an axially extending groove (54) of an external circumferential surface (56) of said sleeve member (40).

6. An actuating force transmission unit as claimed in claim 5, said axially extending groove (54) being one of a group of axially extending grooves (54) distributed about the periphery of said sleeve member (40).

7. An actuating force transmission unit as set forth in claim 3, said housing (18) being provided with a slot (60) adjacent to said sleeve member (40) and substantially parallel to said sleeve axis (B—B) for permitting engagement of said coupling portion (58) of said transmission lever (20) and said coupling engagement portion (54) of said sleeve member (40) through said slot (60).

8. An actuating force transmission unit as set forth in claim 1, said sleeve member (40) and said axle (10) being provided with axial abutment means (10a, 40a) engageable with each other for fixing said sleeve member (40) and said housing (18) with respect to said axle (10) along the axis (A—A) thereof.

9. An actuating force transmission unit as claimed in claim 8, said sleeve member (40) having a radially inwards directed abutment ring (40a) engageable with an axially directed endface (10a) of said axle (10).

10. An actuating force transmission unit as set forth in claim 1, said sleeve member (40) having an annular, substantially axially directed shoulder face (42) engageable with a corresponding shoulder face (44) of said housing (18), said shoulder face (42) of said sleeve member (40) being held in engagement with said shoulder face (44) of said housing (18) by a resilient ring member (46) engageable with an internal surface of said housing (18) and with an axial endface of said sleeve member (40).

11. An actuating force transmission unit as set forth in claim 1, said pivot axis (22) being located on said housing (18) at a location axially and radially outside said axle (10), said first lever arm (20a) extending in substantially orthogonal direction with respect to said axis (A—A) of said axle (10), said second lever arm (20b) being substantially parallel to said axis (A—A) of said axle (10) and extending from said pivot axis (22) in a direction towards a further end portion of said axle (10).

12. An actuating force transmission unit as set forth in claim 1, said transmission lever (20) being biased by spring means (62) toward a terminal pivotal position.

13. An actuating force transmission unit as set forth in claim 3, said transmission lever (20) being biased towards a pivotal position, in which said coupling portion (58) of said transmission lever (20) is in coupling engagement with said coupling engagement portion (54) of said sleeve member (40).

14. An actuating force transmission unit as set forth in claim 1, one of said actuating force transmission unit (24) and said actuating force transmitting means (30) comprising adjustment means (38) for adjusting respective gear change positions of said push member (14).

15. An actuating force transmission unit as set forth in claim 14, said actuating force transmitting means comprising an actuating force transmitting cable (30).

16. An actuating force transmission unit as set forth in claim 14, said adjustment means (38) being provided between said second lever arm (20b) and an actuating force transmitting cable (30) connected to said actuator device.

17. An actuating force transmission unit as set forth in claim 14, said adjustment means (38) comprising an adjustment bolt (26) and an adjustment housing (28), said adjustment bolt (26) being provided with a plurality of indentations (32), said adjustment housing (28) being provided with a spring biased pawl member (34), said pawl member being engageable with said indentations (32).

18. An actuating force transmission unit as set forth in claim 17, said adjustment bolt (26) being freely shiftable with respect to said adjustment housing (28) in a first shifting direction with said pawl member (34) being liftable from engagement with said indentations (32) in response to said shifting in said first shifting direction, said adjustment bolt (26) being locked against movement in a second shifting direction with respect to said adjustment housing (28) by said pawl member (34) biased into engagement with a respective indentation (32).

19. An actuating force transmission unit as set forth in claim 17, said adjustment bolt (26) being pivotally connected to said second lever arm (20b) about a connection axis substantially parallel to said pivot axis (22).

* * * * *